United States Patent [19]

Itoh et al.

[11] Patent Number: 4,622,664

[45] Date of Patent: Nov. 11, 1986

[54] CHANNEL CONTROL SYSTEM FOR LOOP TYPE SIGNAL TRANSMISSION CHANNEL

[75] Inventors: Ken Itoh, Tokyo; Koichi Tokura, Kanagawa; Shigeyuki Fukada, Tokyo, all of Japan

[73] Assignee: Japanese National Railways, Tokyo, Japan

[21] Appl. No.: 657,017

[22] Filed: Oct. 2, 1984

[30] Foreign Application Priority Data

Oct. 19, 1983 [JP] Japan .................................. 58-194403
Oct. 26, 1983 [JP] Japan .................................. 58-199247

[51] Int. Cl.[4] ........................... H04J 3/00; H04J 1/16; H04J 3/14
[52] U.S. Cl. ........................................ 370/86; 370/88; 370/16
[58] Field of Search ........................ 370/85, 86, 88, 15, 370/16

[56] References Cited

U.S. PATENT DOCUMENTS

| | | | |
|---|---|---|---|
| 3,859,465 | 1/1975 | Schenkel et al. | 370/86 |
| 3,904,829 | 9/1975 | Martin et al. | 370/86 |
| 4,136,384 | 1/1979 | Okada et al. | 370/86 |
| 4,199,662 | 4/1980 | Lowe, Jr. | 370/86 |
| 4,205,326 | 5/1980 | Porter et al. | 370/86 |
| 4,210,780 | 1/1980 | Hopkins et al. | 370/86 |

Primary Examiner—Douglas W. Olms
Assistant Examiner—Frank M. Scutch, III
Attorney, Agent, or Firm—Wenderoth, Lind & Ponack

[57] ABSTRACT

A channel control system for a scattered loop type information transmission channel has posts that are linked in a single loop and are served both ways by the same loop. Each post consists of an A-system working in one direction and a similar B-system working in the opposite direction. A mode switch circuit switches between a relay mode for relaying the signal and a terminal mode for separating the A and B systems and returning the signal. Each system has a detection circuit for detecting a channel carrier signal OFF and a carrier ON-OFF signal transmission circuit and a monitor circuit for approach and circulation of the channel code. The mode switch circuit of a post which has detected a channel carrier signal OFF switches to the terminal mode and returns a carrier ON-OFF signal, while a post which has detected a carrier ON-OFF signal switches to the terminal mode and continues to issue a second carrier ON-OFF signal. A portion of the loop which contains a source of the channel carrier signal OFF is cut off from the rest of the loop containing no such source and when the monitor circuit of a post in the terminal mode confirms that the channel code has been circulated to both sides of the loop which has been cut off, its mode switch circuit switches the post to the relay mode and merges itself into the loop when the channel carrier signal OFF has vanished.

3 Claims, 37 Drawing Figures

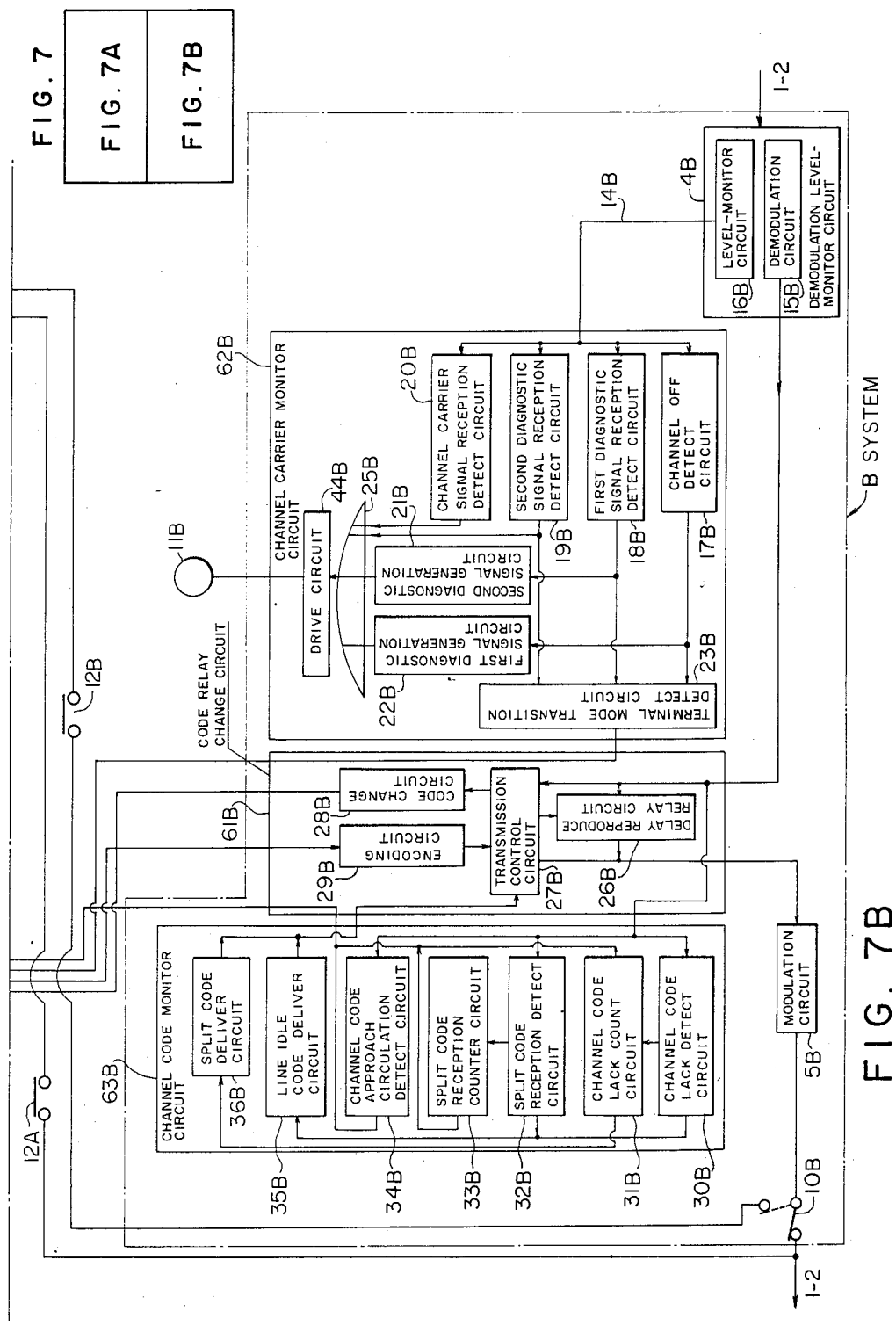

FIG. 9(a) FIRST DIAGNOSTIC SIGNAL
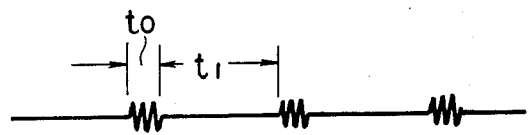
FIG. 9(b) SECOND DIAGNOSTIC SIGNAL
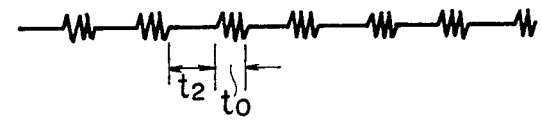
FIG. 9(c) CARRIER SIGNAL
FIG. 11(a)
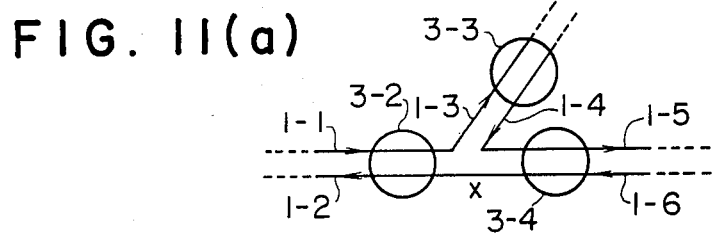
FIG. 11(b)
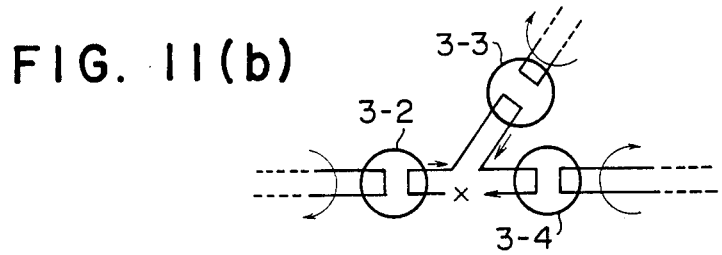
FIG. 11(c)
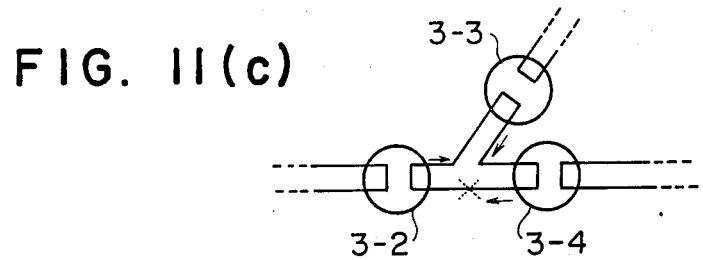

CHANNEL CONTROL SYSTEM FOR LOOP TYPE SIGNAL TRANSMISSION CHANNEL

BACKGROUND OF THE INVENTION AND PRIOR ART

The present invention relates to the channel control system for a loop type signal transmission channel.

As a loop type data transmission system which links up a plurality of information devices (posts) in a loop of transmission channels, there are, as described in detail later, a variety of types available.

When a fault happens somewhere in the transmission channel of this kind of the conventional system, the loop is cut off at the fault spot and the rest of the loop beyond the fault spot is retained as a sound loop. In this case, however, many inconveniences are unavoidable. For example; the transmitting function of a post which is cut off in this way totally ceases and even when the line is restored from the fault condition, the cut-off post cannot be automatically brought to normalcy and it is necessary for this purpose to issue a cut-off cancel order from a master post. Thus, installation of the master post is indispensable for the purpose of channel control and cut-off cannot be effected when a code-relay function fault which does not cause a drop in the carrier signal level occurs.

OBJECT AND BRIEF SUMMARY OF THE INVENTION

The first object of the present invention is to provide a scattered loop system which, being devoid of any specific master post, consists only of posts which perform identical functions, whereby not only when a fault occurs in the channel but also when the channel code relay function ceases, only the faulty portion of the loop is cut off with the rest of the loop retained as a sound loop. In other words, when any sound portion remains in the cut-off loop, the transmitting function of the sound portion is retained.

The second object of the present invention is to provide a loop system which can be automatically restored to normalcy without any special operation, when the cause of a fault vanishes.

The third object of the present invention is to provide a loop system in which a direct signal transmission is possible when a plurality of separate groups of posts linked to a master post are established and a post is isolated from its master post or when a specific master post is down. Namely, signal transmission can be made between a post isolated from its master post and another master post or between a post whose master post is down and another master post and inter-group communication between posts can be made without resort to the master post.

To attain these objects, the system according to the present invention is constituted as follows.

A plurality of information transmission devices (posts) are linked up in a loop of transmission channels. When no information is being transmitted, a single code indicating a line idle is circulated to each post by reproduction and relay. At a post which is required to transmit information to another post, when a line idle code signal is received, the code signal is changed to a line busy and then the information is transmitted to another post. After delivery of the information, said post again delivers a line idle code signal to the channel, whereupon the transmission right is exchanged between the posts. The initial delivery of a line idle code signal to the channel and a subsequent delivery of a new line idle code signal after the initial line idle code has vanished due to noise or other reasons effected by the post which possesses the shortest monitor time for lack detecting the of a code in the channel.

This is a scattered loop type information transmission system, in which the posts are linked up in a single loop and are served both ways by the same loop. Each post consists of A-system which works in one direction and B-system of the same constitution as the A-system which works in the other direction. A mode switch circuit is provided to switch between a relay mode to relay the signal and a terminal mode to separate A-system from B-system and return the signal; each system is equipped with a detection circuit for detecting that the channel carrier signal is OFF and, a transmission circuit for transmitting the carrier ON-OFF signal and a monitor circuit for approach and circulation of the channel code. A post which has detected a channel carrier signal OFF switches itself by its mode-switch circuit to the terminal mode, whereby it returns a carrier ON-OFF signal, while a post which has detected a carrier ON-OFF signal switches itself to the terminal mode, whereby it continues to issue a carrier ON-OFF signal. Thus, a portion of the loop which contains a source of the carrier signal OFF is cut off from the rest of the loop which contains no such source. When an approach and circulation monitor circuit of a post in the terminal mode confirms that the channel code has been circulated to both sides of the loop which has been cut off, the post switches itself to the relay mode by means of its mode-switch circuit and merges into the loop which is cut off when the channel OFF signal has vanished.

BRIEF DESCRIPTION OF THE DRAWINGS

Other objects, features and advantages of the present invention will become more apparent from the following detailed description made in conjunction with the attached drawings, wherein:

FIG. 9(a) is a waveform of one example of the first diagnostic signal in the present invention.

FIG. 9(b) is a waveform of one example of the second diagnostic signal in the present invention.

FIG. 9(c) is a waveform of a carrier signal according to the present invention.

FIGS. 11(a) to (c) are circuit diagrams respectively illustrating other examples of channel control according to the present invention.

DETAILED DESCRIPTION OF THE INVENTION

At first referring to FIGS. 1 to 4, problems with the conventional loop type signal transmission channel are to be discussed.

Figure 1:
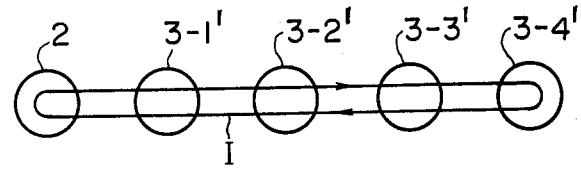
FIG. 1 is a block diagram illustrating the conventional loop type data transmission system.

FIG. 1 shows an example of one master post 2 being linked up to the remote posts 3-1'—3-4' in a loop of channels I.

In this case, suppose a fault happens at one spot in the loop, or the signal transmitting function at one post fails. Then code transmission over the loop will become impossible, resulting in a down system. Therefore a proposal has been made for a system which will not be wholly down on account of a partial fault.

Figure 2:
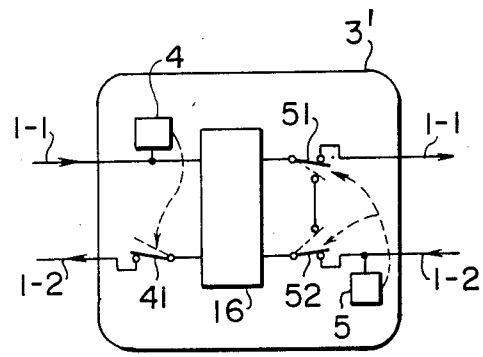
FIG. 2 is a circuit diagram illustrating a channel control method proposed for the conventional loop type data transmission system.

FIG. 2 illustrates an example of the proposal, i.e., the channel control mechanism of a remote post 3', in which 16 is the main part of the remote post.

When the receiving level of the down channel 1-1 drops, the transmitting carrier signal is turned OFF by opening the output contact 41 of the level detector 4. When the receiving level of the up channel 1-2 drops, the transmitting signal of the down channel 1-1 is returned to the up channel 1-2 through switching of the output contacts 51 and 52 of the level detector 5 to the dotted-line side. Thus the loop is cut and turned back at upper side of a portion which has developed a fault, while a sound portion of the loop is retained by cutting off the lower side of the fault.

Figure 3:
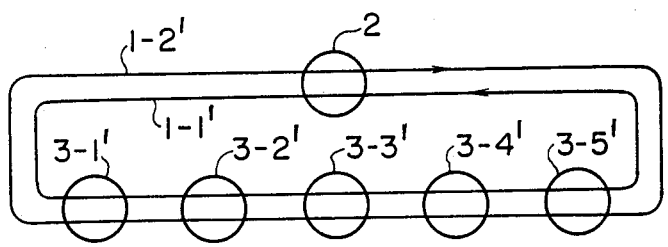
FIG. 3 is a block diagram illustrating the conventional loop type transmission system in which the posts are linked up in two loops of a transmission channel.

FIG. 3 shows an example of two loops 1-1' and 1-2' different in direction being employed to link up the remote posts 3-1'—3-5' to the master post 2. Normally one loop is a working loop and the other is a spare loop. When the working loop fails, the spare one takes over. When the two loops fail, the loop is turned back at the posts 3-2' and 3-4' as illustrated in FIG. 4 which are located at the ends of the fault portion and by making sound portions constitute a single loop, the function of the sound portion can be retained.

Figure 4:
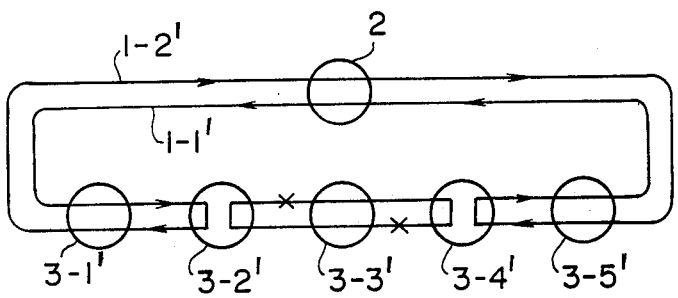
FIG. 4 is a block diagram illustrating a channel control method when a fault occurs in the loop type data transmission system of FIG. 3.

In FIG. 4, the master post 2, utilizing the counter clock wise channel 1-1', issues a "turn-back order" to the first post 3-1'. Test transmission is done between the master post 2 and the first post 3-1'. Upon confirmation of normalcy of the transmitting function between the two posts, a "turn-back cancel order" is issued to the first post 3-1', followed by issuing of a similar order to the second post 3-2'. Thus, by repetition of the same procedure, the soundness-check area is expanded until a test transmission fault is encountered. A "turn-back order" is then issued to a post ahead of the post which has developed the fault. Next, utilizing the clockwise channel 1-2', the master post 2 successively makes a transmission test beginning with the first post 3-5' and it issues a "turn-back order" to a post ahead of the post which has failed in the transmission test. The fault portion is eliminated by a checking procedure in both direction.

The conventional systems including the one described above, however, have the following drawbacks: the cut-off loop wholly ceases to function. Even upon recovery from a fault, the posts cannot automatically be restored to normalcy without an issue of a "turn-back cancel order" from the master post. Accordingly, installation of a master post is indispensable for channel control, particularly in a single loop system as illustrated in FIG. 2. A partial cut-off of the loop cannot occur when the code relay function fails without being accompanied by a drop in the carrier signal level.

Referring to the preferred embodiments illustrated in FIGS. 5 to 16, the present invention is described below.

Figure 5:
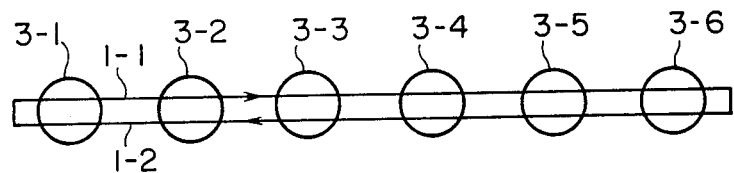
FIG. 5 is a block diagram illustrating an embodiment of the present invention.
Figure 6:
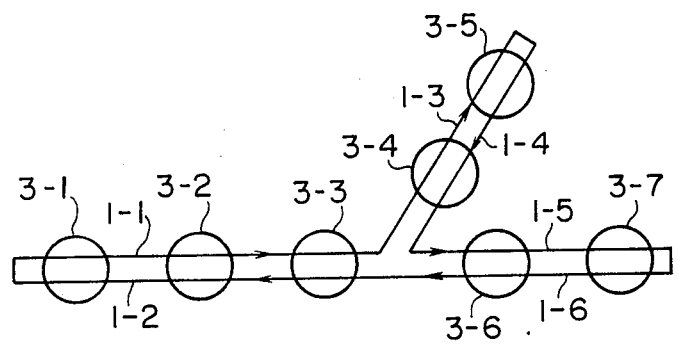
FIG. 6 is a block diagram illustrating another embodiment of the present invention.

FIGS. 5 and 6 illustrate examples of the posts being linked up in a single loop, FIG. 5 being a case of the posts being linearly arranged and FIG. 6 being a case of the posts being arranged in branches, which is applied to power control at substations for electric traction of a railway.

Figure 7A:
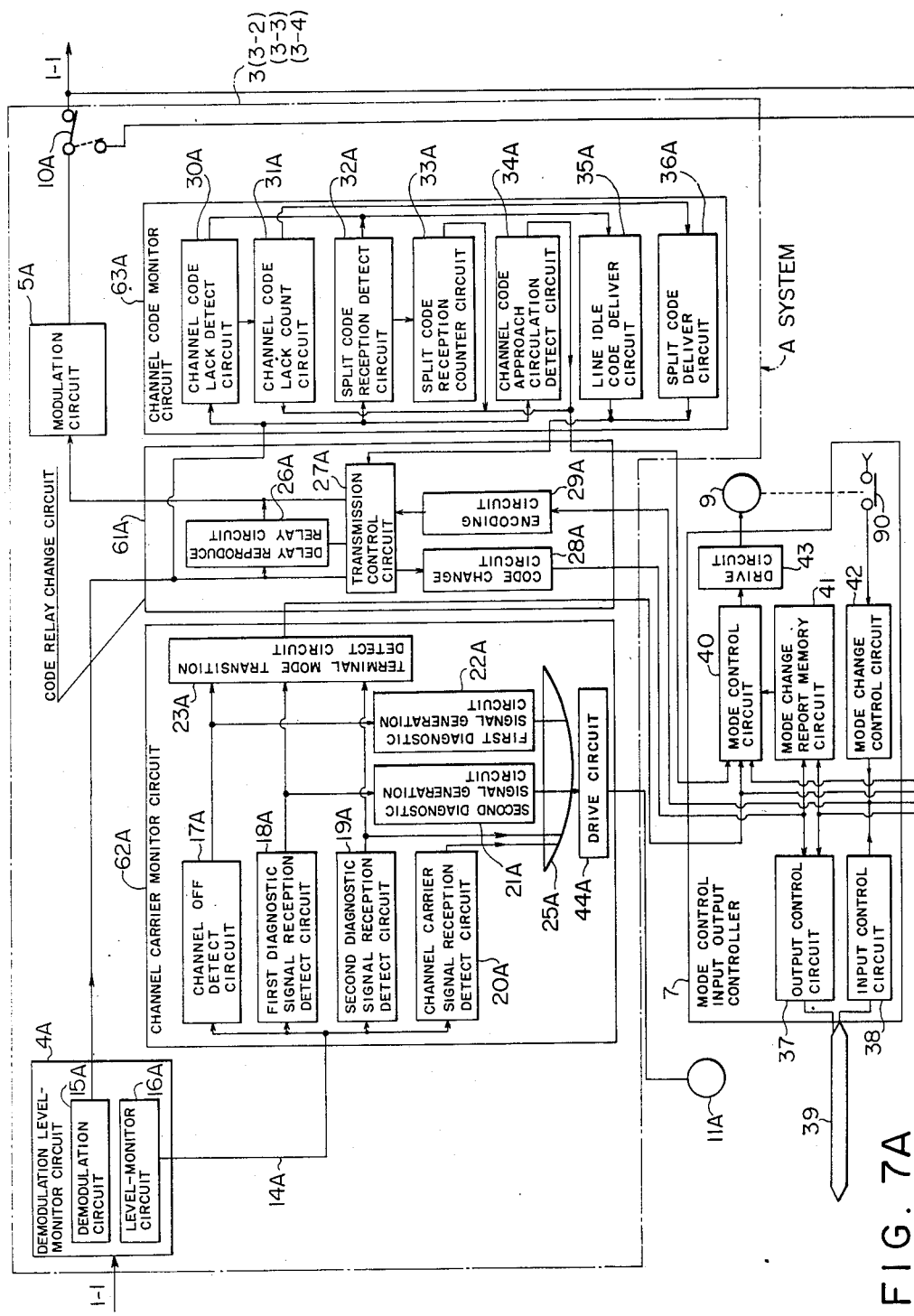
FIG. 7, which consists of FIGS. 7A and 7B together, is a detailed block diagram illustrating a post according to the present invention.

Posts 3-1 to 3-7 are posts of the same composition and there exists nothing equivalent to the conventional master post. A post consists of A-system which goes into the down channel 1-1, and a B-system which goes into the up channel 1-2, and a mode control input/output controller 7 coming between A-system and B-system, as illustrated in FIG. 7, i.e.—FIGS. 7A-7B.

The A-system comprises a demodulation/level-monitor circuit 4A, a channel carrier monitor circuit 62A, a code relay change circuit 61A, a channel code monitor circuit 63A and a modulation circuit 5A. The demodulation/level-monitor circuit 4A includes a demodulation circuit 15A used to demodulate the input signal from the down channel 1-1 and a level-monitor circuit 16A used to detect a drop in the input signal level. The channel carrier monitor circuit 62A comprises a channel OFF detect circuit 17A, a first diagnostic signal reception detect circuit 18A, a second diagnostic signal reception detect circuit 19A and a channel carrier signal reception detect circuit 20A which are connected in parallel to the output side of the level-monitor circuit 16A, a terminal mode transition detect circuit 23A to which are connected the output sides of the channel OFF detect circuit 17A, the first diagnostic signal reception detect circuit 18A and the second diagnostic signal reception detect circuit 19A, a first diagnostic signal generation circuit 22A to which the output side of the channel OFF detect circuit 17A is connected and a second diagnostic signal generation circuit 21A to which the output side of the first diagnostic signal reception detect circuit 18A is connected. The first diagnostic signal generation circuit 22A and the second diagnostic signal generation circuit 21A, and the second diagnostic signal reception detect circuit 19A and the channel carrier reception detect circuit 20A are all connected to an OR gate 25A. The output side of the OR gate 25A is connected to a drive circuit 44A of the relay 11A. A code relay change circuit 61A is constituted by connecting a delay reproduce/relay circuit 26A via a transmission control circuit 27A to a code change circuit 28A and an encoding circuit 29A. A channel code monitor circuit 63A comprises a channel code lack i.e.—code absence detect circuit 30A, a split code reception detect circuit 32A and a channel code approach/circulation detect circuit 34A which are connected in parallel to the output side of the demodulation circuit 15A and a line idle code deliver circuit 35A and a split code deliver circuit 36A which are connected to parallel to the input side of the transmission control circuit 27A, and a the channel code lack i.e.—code absence counter circuit 31A and a split code reception counter circuit 33A and a channel code approach/circulation detect circuit 34A which are connected in parallel to the input side of the mode control circuit 40. The mode control input/output controller 7 possesses an output control circuit 37 which is connected to a transmission line 39 connected to the unit to be controlled and an input control circuit 38, a mode control circuit 40, a mode change report memory circuit 41, a mode change control circuit 42, and a drive circuit 43 for the switch relay 9. However, the mode change report memory circuit 41 and the mode change control circuit 42 are added only in the example illustrated in FIG. 14 and thereafter. The input side of the mode control circuit 40 is connected to the output side of a parallel circuit for the channel code lack count circuits 31A and 31B and other circuits and to the output side of the terminal mode transition detect circuits 23A and 23B. The input side of the output control circuit 37 and the mode change report/memory circuit 41 are connected to the output side of the code charge circuits 28A and 28B. The input side of the encoding circuit 29A is connected to the output sides of the input control circuit 38 and the mode change control circuit 42.

Elements 10A and 10B are the contacts of the switch relay 9 and they change to the dotted line side through the action of the switch relay 9 or drop away to the solid line side.

Element 11A is a relay consisting of a mercury switch or the like, which is normally in operation and repeats intermittent action when sending out the first diagnostic signal or the second diagnostic signal. With the ON-OFF operation of the diagnostic relay, the contact 12A closes or opens.

The B-system is located symmetrically with respect to the A-system, with the demodulation level monitor circuit 4B and the modulation circuit 5B inserted in the up channel 1-2. Units in the B-system which are of the same composition as in the A-system are indicated by identical symbols with B used instead of A as in the A-system; for instance, element 62A in the A-system is of the same composition as element 62B in the B-system. Element 11B in the B-system is equivalent to the diagnostic relay 11A in the A-system. With the ON-OFF operation of said diagnostic relay 11B, the contact 12B closes or opens.

When the transmission channel has no post demanding a transmission, a "line idle" code, i.e., SYNC $W_{(o)}$ is circulated. SYNC is a synchronized code; W is a channel code; $W_{(o)}$ indicates a line idle and $W_{(1)}$ indicating a line busy. Hereinafter, the line idle code and the line busy code are collectively named a channel code.

Which post should transmit a line idle code will be discussed later.

In a post with no demand for a transmission, a line idle code received from the demodulation circuits 15A and 15B is reproduced and relayed to the loop at the delay reproduce relay circuits 26A and 26B. The line idle code is also received at the channel code lack detect circuits 30A and 30B, such that the post detects that a line idle code is in circulation.

When information from a transmission-demanding post, i.e., a signal indicating that a device is to be controlled comes into the input control circuit 38 and goes out from the input control circuit 38, the output is encoded by the encoding circuits 29A and 29B and goes into the transmission control circuits 27A and 27B. The transmission control circuits 27A and 27B, receiving the line idle code in circulation, instead of this code, transmit a line busy code including information, that is, SYNC, $W_{(1)}$, F, FR, TO, DATA to the loop via the modulation circuits 5A and 5B. SYNC is a synchronized code; $W_{(1)}$ is a line busy code; F is a transmission control code indicating the transmission mode; FR is a transmitting post code; TO is a receiving post code; and DATA is a message code.

In the meantime the receiving post transmits the information coming from the transmitting post to the device to be controlled via the demodulation circuits 15A and 15B, the transmission control circuits 27A and 27B, the code change circuit 28A and 28B and the output control circuit 37.

When the transmitting post completes the transmission of information, it delivers a line idle code from the line idle code deliver circuits 35A and 35B to the loop. Thus, the transmitting post assigns the transmitting right to another unspecified post.

When the initial delivery of the line idle code or the supplemental delivery of it in the case of a channel code having vanished is entrusted to only one specific post (e.g.—a master post), the system will be a concentrated type and if the delivery of the line idle code is entrusted to any one of the posts acting at a particular time in the loop, the system will be a scattered type. The present invention adopts the scattered type of system. Namely, in the channel code lack detect circuit 30 of the channel code monitor circuit 63 at each post, a different detection time for the channel code lack (the time lapse from reception of the last channel code to the detection of a channel code lack) is set. In this case, if the difference in the set times $T_i-T_j$ is made larger than one loop cycle time of code $t_e$, in other words if $|T_i-T_j|>t_e (i\neq j)$, the delivery of the line idle code will be confined to one of the posts, that is a post with the shortest set time for the channel code lack detection.

In this arrangement according to the present invention, when the state of channel code lack or absence continues for a specified period of time, a line idle code will automatically begin to circulate in a loop comprising multiple posts, thus enabling information exchange between the posts in an arbitrary sub loop (this rule for channel code delivery is hereinafter called "Rule (0)").

FIGS. 10(a) to (f) illustrate the channel control by the present invention in the case when the up channel 1-2 between the post 3-2 and 3-3 fails at the spot marked X.

Figure 8A:
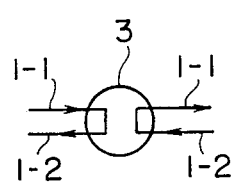
FIGS. 8(a) and (b) are circuit diagrams conceptually illustrating respectively the terminal mode and the relay mode according to the present invention.
Figure 8B:
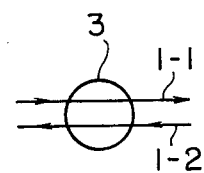
Figure 10A:
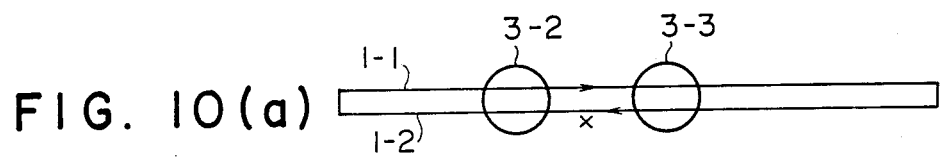
FIGS. 10(a) to (f) are circuit diagrams respectively illustrating some examples of channel control according to the present invention.

When a fault occurs at the X spot, the level monitor circuit 16B of the B-system at the post 3-2 in FIGS. 7 and 10(a) and (f) detects a drop of the carrier signal in the channel below a specific level and, upon receiving the detect signal 14B, the channel OFF detect circuit 17B of the channel carrier monitor circuit 62B of B-system determines that the upper (i.e. upstream) side of the channel is OFF. The terminal mode transition detect circuit 23B then acts to operate the mode control detect circuit 40 and the relay drive circuit 43 and the switch relay 9. As the result thereof, the contacts 10A and 10B of the post 3-2 turn to the dotted line side, thereby separating the A side loop from the B side loop at the post 3-2 and thus, as indicated in FIG. 8(a), a terminal mode emerges (Rule (1)).

On the other hand, the output of the channel OFF detect circuit 17B in the B-system of the post 3-2 is also fed to the first diagnostic signal generation circuit 22B and the relay drive circuit 44B is thus brought into intermittent action through OR gate 25B, thereby bringing the relay 11B into intermittent operation which causes the contact 12B to open and close intermittently. Thus, the continuous carrier signal from the modulation circuit 5B is changed into the first diagnostic signal as illustrated in FIG. 9(a) and the first diagnostic signal is transmitted to the modulation circuit 15A of the A-system at the post 3-3 (Rule (1)).

In the A-system at the post 3-3, the first diagnostic signal of a intermittently lowered level is received via the level monitor circuit 16A at the first diagnostic signal reception detect circuit 18A and this signal drives the switch relay 9 via the terminal mode transition detect circuit 23A, and the mode control circuit 40, thereby turning the contacts 10A and 10B to the dotted line side and bringing the post 3-3 into a terminal mode, while at the same time the signal brings the second diagnostic signal generation circuit 21A into operation and brings the relay drive circuit 44A via the OR gate 25A into intermittent operation, to drive the relay 11A into intermittent operation and causes the contact 12A to open and close intermittently. Thus, the second diagnostic signal illustrated in FIG. 9(b) is continuously transmitted in the direction of the B-system at the post 3-2 (Rule (2)).

Figure 10B:
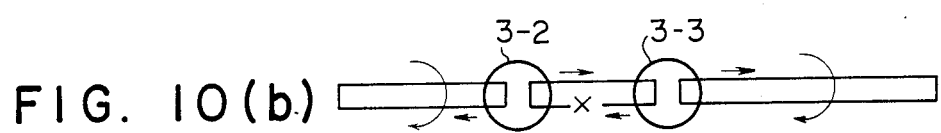
Figure 10C:
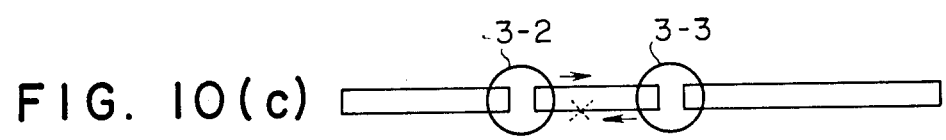
Figure 10D:
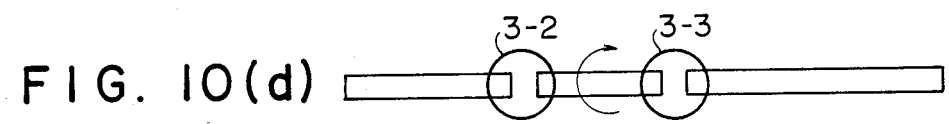
Figure 10E:
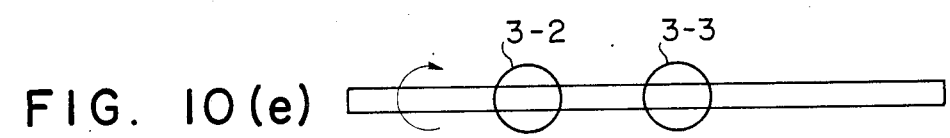

In this way, as illustrated in FIG. 10(b), the loop is split into three parts, i.e., a sound part including the A-system of the post 3-2, a fault part between the B-system of post 3-2 and the A-system of part 3-3, and a sound post including the B-system of the post 3-3. According to Rule (0), a line idle code circulates to the sound part as shown by circular arrow line, thereby establishing the information transmitting function and, with only the fault part excluded, the second diagnostic signal waiting for recovery continues to be transmitted. In reality, however, on account of X spot, the B-system at the post 3-2 does not receive the signal and only a diagnosis is being made.

Upon recovery from the channel OFF situation, the second diagnostic signal begins to be issued from the A-system of the post 3-3 to the B-system of the post 3-2, bringing the second diagnostic signal reception detect circuit 19B of B-system at the post 3-2 into action. In this case, the A-system and the B-system at the post 3-2 have been in a terminal mode and the terminal mode transition detect circuit 23 is held in action but its output goes to the OR gate 25 through the second diagnostic signal reception detect circuit 19B. Thus, with the OR gate 25B ON, the relay drive circuit 44B ON and the relay 11B active, a carrier signal which normally continues to be issued from the modulation circuit 5B as it is transmitted (Rule (3)). At the post 3-3, when the first diagnostic signal to the A-system ceases to be received, the second diagnostic signal generation circuit 21A is brought into action, but on account of an output from the channel carrier signal receive detect circuit 20A, the OR gate 25A turns ON. Thus, a carrier signal from the modulation circuit 5A continues to be transmitted as it is transmitted (Rule 4). At the post 3-2, when the second diagnostic signal to the B-system ceases to be received, an output ceases to come out of the B-system second diagnostic signal receive detect circuit, but on account of an output from the channel carrier signal receive detect circuit 20B, the OR gate 25B turns ON. Thus, with the relay drive circuit 44B and the relay 11B continuously in action, a carrier signal from the modulation circuit 5B continues to be transmitted. As the result, in due time a channel code begins to circulate between the posts 3-2 and 3-3.

Figure 10F:
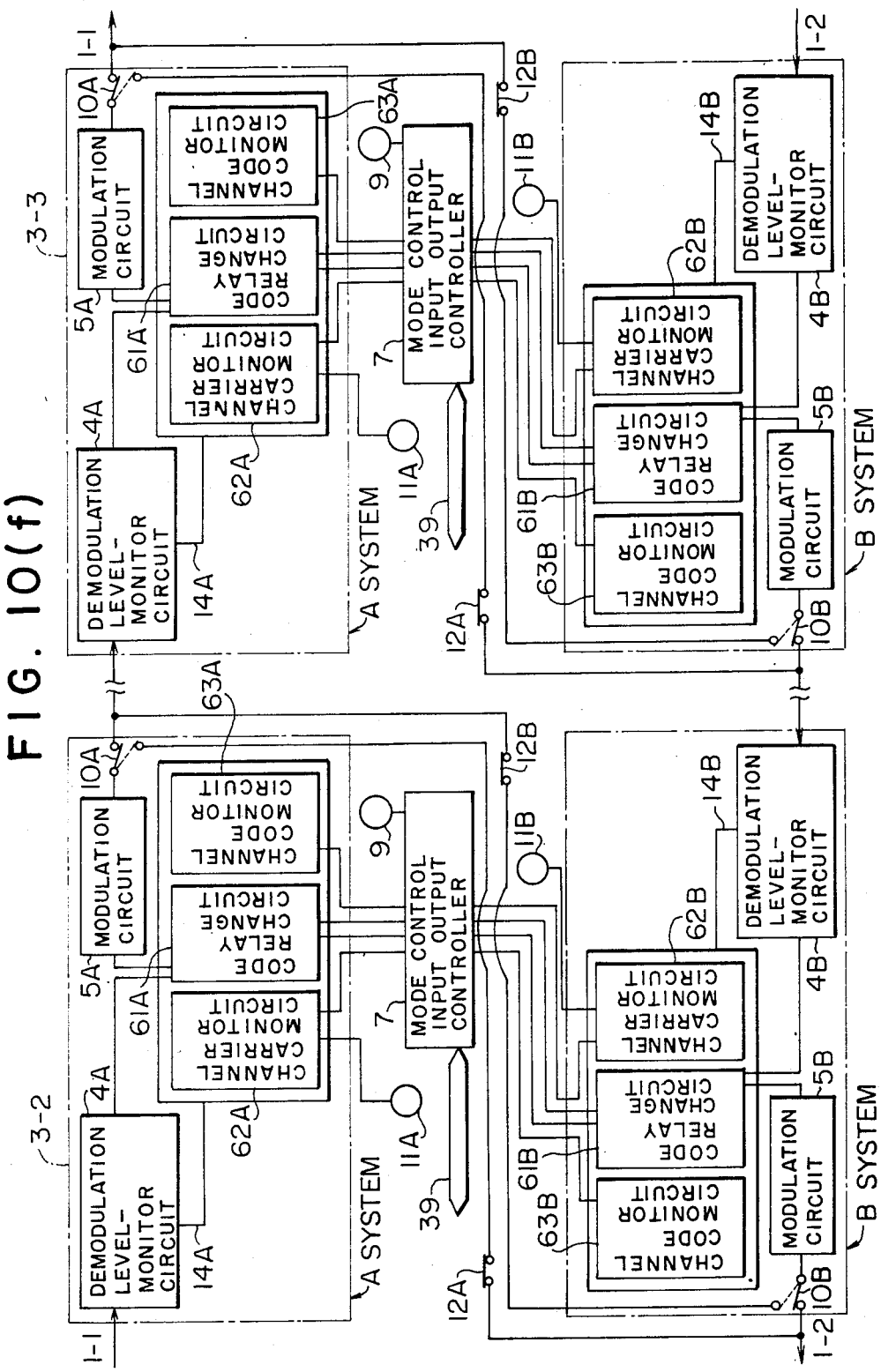

For instance, the channel code approach/circulation detect circuit 34A of the channel code monitor circuit 63A of the A-system at the post 3-2 in FIG. 10(f) detects through the code relay change circuit 61A that a channel code is circulating on the upper side of the A-system and the detect signal goes into the mode control detect circuit 40 of the post. Similarly, the circulation of a channel code in the loop between the B-system of post 3-2 and the A-system of post 3-3 is detected by the channel code approach/circulation detect circuit 34 B of the B-system of post 3-2 and the detect signal goes into the mode control detect circuit 40. The mode control detect circuit 40, upon receiving the two detect signals, causes the relay drive circuit 43 to drop away and causes the switch relay 9 to drop away and causes the contacts 10A and 10B to turn in the direction of the solid line, and brings the A-system and the B-system of the post 3-2 into a relay mode. Similarly, when the mode control circuit 40 of post 3-3 detects the circulation of a channel code on both sides, the A-system and the B-system of post 3-3 are brought into a relay mode.

Suppose in the above example that a fault occurs in the down, i.e.—downstream, channel between the posts 3-2 and 3-3. Then the first diagnostic signal issued from the B-system of the post 3-2 now in a terminal mode does not reach the A-system of the post 3-3 and accordingly, the A-system of the post 3-3 does not transmit the second diagnostic signal. However, upon recovery from the two faults, similar to that noted above, the loop is restored to normalcy through a similar process.

To sum up the above, the channel control according to the present invention is effected according to the following rules.

Rule (1): The system of a post which has detected a channel OFF transforms itself into a terminal mode and then returns the first diagnostic signal.

Rule (2): The post which has detected the first diagnostic signal transforms itself into a terminal mode and returns the second diagnostic signal.

Rule (3): The post which has detected the second diagnostic signal transforms itself into a terminal mode and returns a carrier signal.

Rule (4): The post which has received the carrier signal determines that recovery from channel OFF has been completed and then it issues a carrier signal.

Rule (5): The post in the terminal mode transforms itself into a relay mode, when a channel code begins to circulate to both sides of it.

It should be noted that transformation into a terminal mode according to Rule (3) in the above does not apply to the above examples, but does to the following examples.

FIGS. 11(a)–(c) illustrate a case of channel OFF happening in branch sections.

Now suppose a fault occurs at a spot X in the up channel between the posts 3-2 and 3-4. Then, similar to the case in FIG. 10(f), as illustrated in FIG. 11(b), the post 3-2 turns into a terminal mode according to Rule (1). In consequence, the B-system issues the first diagnostic signal and according to Rule (2), the post 3-3 transforms itself into a terminal mode to issue the second diagnostic signal from its A-system, while according to Rule (3), the A-system of the post 3-4 transforms itself into a terminal mode to issue a carrier signal.

To take, for example, the post 3 in FIG. 7, the A-system of the post 3-4 receives the second diagnostic signal issued from the post 3-3, at its second diagnostic signal reception detect circuit 19A and, by issuing a terminal mode transition order to its mode control detect circuit 40 from its transition detect circuit 23A, it transforms itself into a terminal mode. Meanwhile, the output from the second diagnostic signal reception detect circuit 19A goes to the OR gate 25A to bring the OR gate 25A ON, and the relay 11A goes into action and in a normally issued carrier signal continues to be issued from the modulation circuit 5A. On account of the X spot fault, however, the carrier signal does not reach the post 3-2. Thus, only the fault part between the B-system of post 3-2 and the A-system of post 3-3 is under diagnosis and waiting for recovery, and a channel code is circulated to the remaining sound parts, i.e., to the side of the A-system of post 3-2, and to the side of the B-system of post 3-3 and to the side of the B-system of post 3-4 (Rule (0)).

Upon recovery from channel OFF, as shown in FIG. 11(c), the B-system of the post 3-2 receives a carrier signal according to Rule (4) and thereafter the carrier signal fills the A-system of the post 3-3, and the A-system of the post 3-4 and the fault part and soon, according to Rule (0), a channel code begins to circulate, thereby restoring the state of FIG. 11(a).

FIGS. 12(a)-(f) illustrate a case of a fault happening in the code relay/change circuit 61B of the B-system of the post 3-4.

Figure 12A:
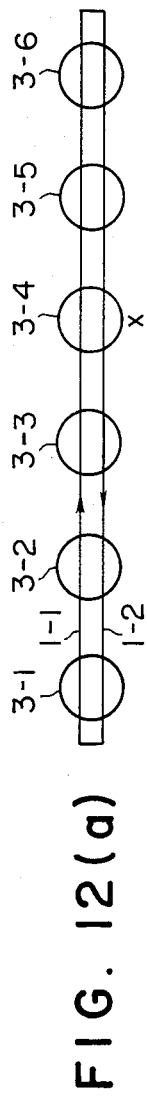
FIGS. 12(a) to (f) are circuit diagrams respectively illustrating still other examples of channel control according to the present invention.
Figure 12B:
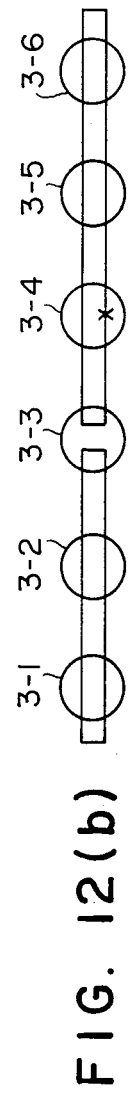
Figure 12C:
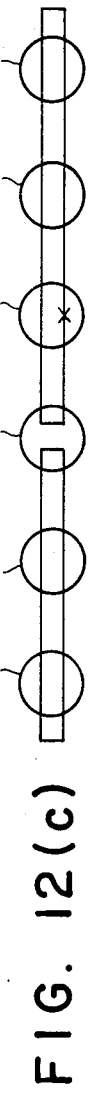
Figure 12D:
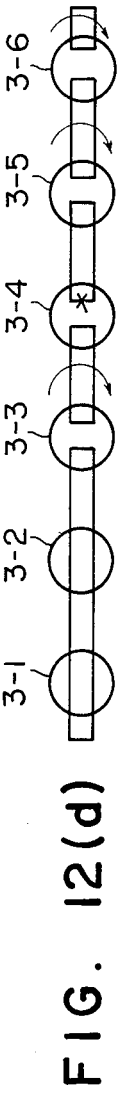

Referring to FIG. 7, this case will be discussed. Assume the post 3-3 is the post with the shortest detection time for channel code lack. Then, according to Rule (0), the B-system of the post 3-3 detects a lack of channel code by the channel code lack detect circuit 30B and every time it does so, it delivers a line idle code through the line idle code deliver circuit 35B. However, since the code relay/change circuit 61B of the B-system of the post 3-4 is at fault, the code is not delivered to the loop. The channel code lack count circuit 31B of the B-system of the post 3-3 receives an output from the channel code lack detect circuit 30B and, after counting the number N of lacks, or absences its output does to the mode control detect circuit 40, thereby causing the switch relay 9 to act to transform itself into a terminal mode (Rule (6)). The split code deliver circuit 36B then transmits a split code to the posts 3-4— 3-5— via the transmission control circuit 27B, and the modulation circuit 5B and the contacts 10A and 10B which are now turned to the dotted line side (Rule (7)). A post which has received a split code relays the split code via the delay reproduce/relay circuit 26A to the lower, i.e. downstream, side, while a post at the lower side, for example, the post 3-4, receives the code at its split code reception detect circuit 32A, and it delivers the code through its split code reception counter circuit 33A to the mode control detect circuit 40 and then changes itself into a terminal mode (Rule (8)) so as to split the lower side loop of the post 3-4 into loop elements, as shown in FIG. 12(d).

Figure 12E:
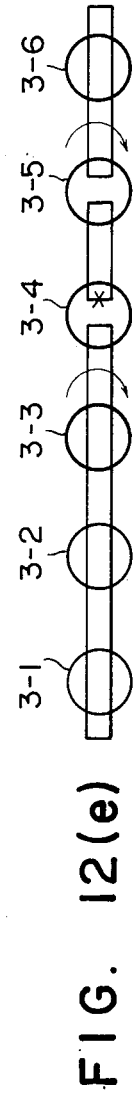
Figure 12F:
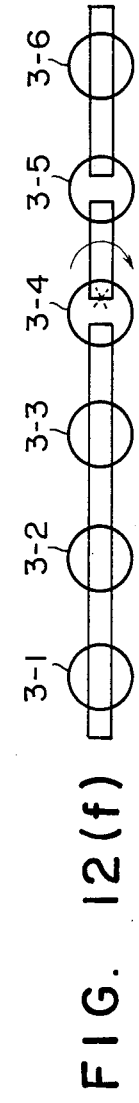

Meanwhile, to the sound loop elements on the upper side including the A-system of the post 3-4 and on the lower side including the B-system of the post 3-5, a channel code begins to circulate according to Rule (0) and the sound elements merge to each other according to Rule (5) and, as indicated in FIG. 12(e), only the fault element, is left. In the fault element the split code deliver circuit 36B of the B-system of the post 3-4 keeps issuing a split code, waiting for recovery from the fault.

Upon recovery from the fault, the split code reception detect circuit 32A of the A-system of the post 3-5 receives a split code; a line idle code is delivered through the line idle code deliver circuit 35A and with the split code deliver circuit 36A cut off by the transmission control circuit 27A, a line idle code is circulated to the fault loop (Rule (9)). Then, the whole loop merges according to Rule (5).

As stated above, the post mentioned in the example illustrated in FIG. 12 acts according to the following rules as well as to the above-mentioned rules (0) to (5):

Rule (6): A post which has counted N times the channel code lack in succession changes itself to a terminal mode.

Rule (7): A post which has counted N times the channel code lack in succession and changed itself to a terminal mode transmits a split code to the other posts.

Rule (8): A post which has successively received a split code N times relays said split code to the other posts and thereafter changes itself to a terminal mode.

Rule (9): A post which has been sending a split code according to Rule (7), transmits a channel idle code when said post receives a split code.

Next, the application of the present invention to a remote monitor/control system is to be discussed.

As is well known, the remote monitor/control system is constituted such that a control station (called "master station") monitors the state of devices located far therefrom which are to be controlled (called "remote stations") and issues a control order to the remote stations.

In this system it is often arranged such that the remote stations are equipped with an appropriate control function so that they can control themselves to a certain extent without being individually instructed from the master station. In such an arrangement of the system, interlock signals are exchanged for the purpose of control between the remote stations appropriately equipped. Usually in the remote monitor/control system, there is provided one master station for a plurality of remote stations (hereafter a set of a master station and remote stations sharing a common transmission channel is designated as "group"). In the case of a large-scale system, a master station is assigned for each one of the "groups" into which the remote stations are divided.

Figure 13A:
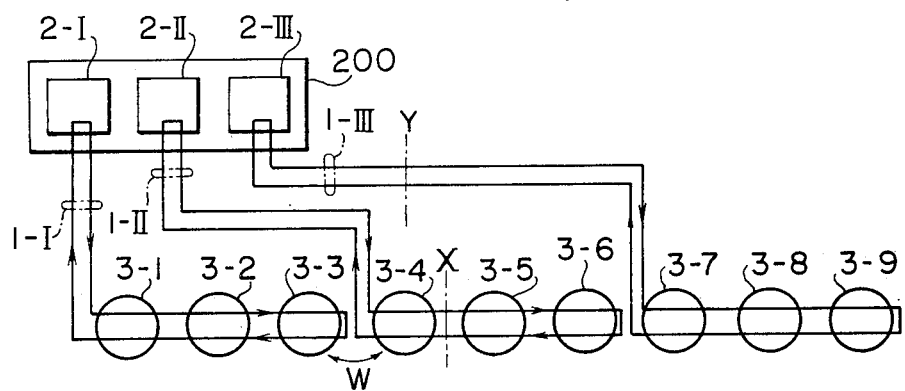
FIGS. 13(a) to (c) are circuit diagrams illustrating difficulties encountered when the posts according to the present invention are taken as remote posts in the conventional circuit composition for information transmission in which separate groups of one master post which are linked up to numerous remote posts in a loop of channels are provided.
Figures 13B, 13C:
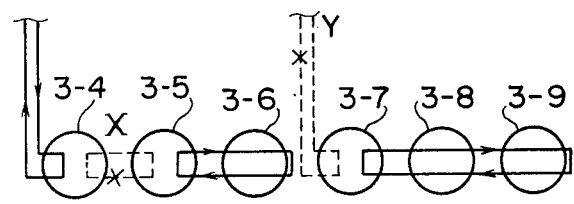

FIGS. 13(a) to (c) illustrate examples of remote stations of the same composition as the posts shown in FIG. 7 according to the present invention being introduced in the conventional channel of the remote monitor control system, wherein the remote stations 3-1, 3-2–3-9 are divided into three groups (group I, group II and group III) and to these groups are respectively assigned the master stations 2-I, 2-II and 2-III; in each group a master station and the numerous remote stations are linked up via separate loop channels 1-I, 1-II and 1-III.

When under this arrangement, the channel fails at the spot X in FIG. 13(a), it is apparent from the above that the B-system of the post 3-4 and the A-system of the post 3-5 change themselves into a terminal mode according to Rule (1); group II is split into three parts and mutual contact is maintained among the posts 3-5 and 3-6, which belong to a sound loop.

If the channel fails at the spot Y, as shown in FIG. 13(c) according to Rule (1), the A-system of the post 3-7 detects the spot and turns into a terminal mode. Thus, information exchange is retained between the posts 3-7, 3-8 and 3-9 and upon recovery from the fault, the separated loop merges again according to Rule (5).

If even then the channel becomes abnormal at the spot X, the posts 3-5 and 3-6 will be cut off from the master station 2-II and if the channel fails at the spot Y, all the remote stations belonging to the group will be isolated from the master station. Furthermore, when a master station is down, the remote stations belonging to the group will be isolated from that master station.

Thus, in the event of a fault in the channel, mutual contact between isolated remote stations will be maintained, but with the loss of contact with the master stations, the transmission function will seriously deteriorate. Meanwhile, direct mutual contact between remote stations in different groups (for instance, between the post 3-3 and 3-4 indicated by W will be impossible and it must rely on transmission between the master stations 2-I and 2-II.

Figure 14A:
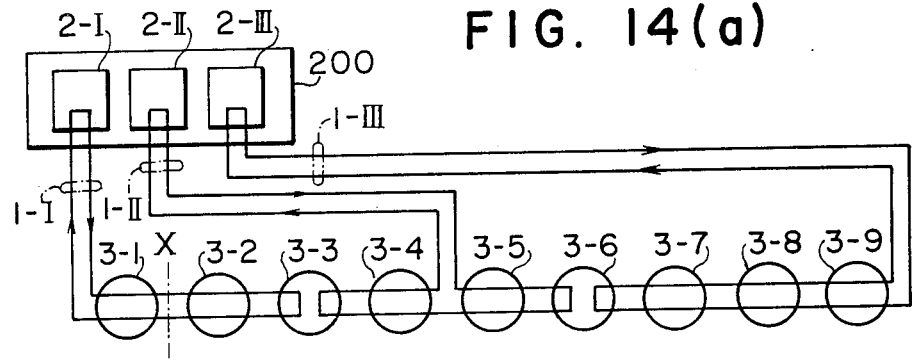
FIGS. 14(a) to (d) are circuit diagrams respectively illustrating still other examples of channel control according to the present invention.
Figure 14B:
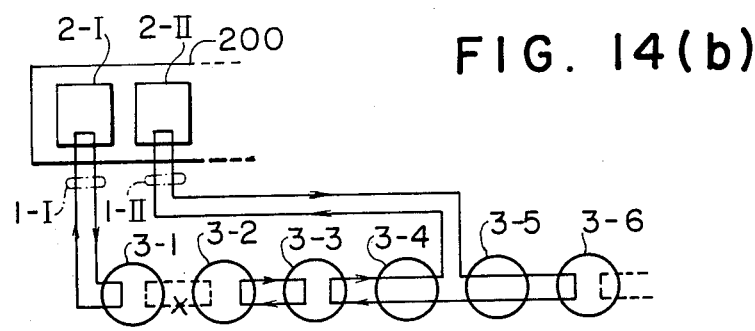
Figure 14C:
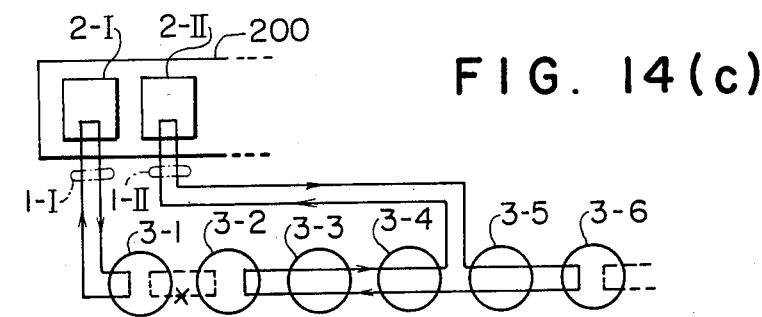
Figure 14D:
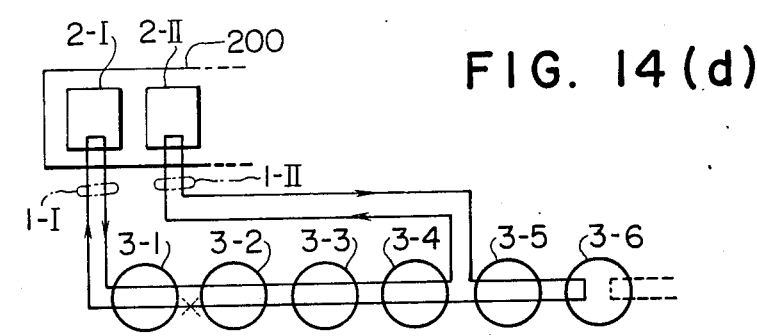
Figure 15A:
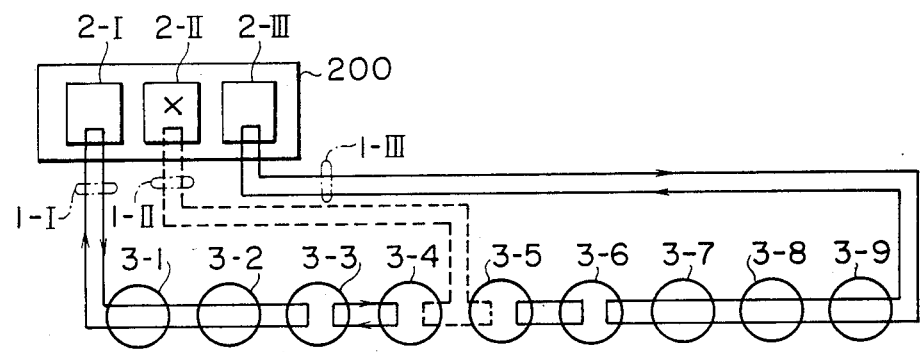
FIGS. 15(a) and (b) are circuit diagrams illustrating respectively still other examples of channel control according to the present invention.
Figure 15B:
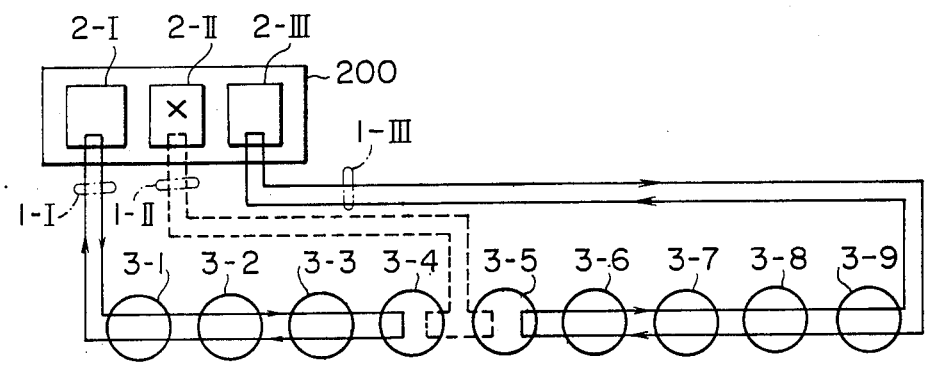

The examples illustrated In FIGS. 14 and 15 are free from the above-mentioned trouble.

The channel composition in the present example is characterized by the following two points. First, in the case of an extreme-positioned one of the groups, a remote station at one end of the group is linked to the master station and in the case of intermediate groups, a midpoint station of the group is linked to the master station. Second, on a group-to-group boundary, the loop channel for the two groups serves one common station. Remote stations straddling two adjacent group loops are to be called "terminal designated posts"; and in contrast to them, the other stations in general are to be called "relay designated posts".

In FIGS. 14 and 15, 2-I, 2-II, and 2-III are master stations; 1-I, 1-II and 1-III are single loop systems; 3-1, 3-2, 3-4, 3-7, 3-8, 3-9 are relay designated posts; and 3-3, 3-6 are terminal designated posts. Relay designated posts and terminal designated posts are ones having the mode control input/output controller 7 newly added to the mode charge report/memory circuit 41 and the mode change control circuit 42 which are connected to the transmission control circuit.

Terminal designated posts are in a normal terminal mode and they are provided with the following function. The terminal designated post in a terminal mode when it finds itself isolated from at least one master station in the two loops on both sides of it, transforms itself into a relay mode (Rule (10)) with the proviso that the conditions according to Rule (5) be satisfied; the terminal designated post in a relay mode, when it recognizes that two master stations have taken part in the loop to which it belongs, transforms itself into a terminal mode (Rule (11)). The difference between the relay designated post and the terminal designated post lies in that the former acts based on Rules (0) to (9), whereas the latter acts based on Rules (0) to (4) and Rules (6) to (11).

To be more specific, the terminal designated post, for instance in a terminal mode, when it knows that a post located between it and the master station on its left side has turned into a terminal mode, knows that the loop on its left side has been isolated from the master station on the left side and according to Rule (10), transforms itself into a relay mode. The same can be said about the loop on the right side. When the terminal designated post in a relay mode finds that all the posts between the post and the master station on the left or right side which were in a terminal mode have changed to a relay mode, the post knows that both master stations on the left and right sides have taken part in the loop to which it belongs and then according to Rule (11), transforms itself into a terminal mode. The terminal designated post remains in a normal terminal mode.

Suppose in FIG. 14(a) that the up channel between the relay designated posts 3-1 and 3-2 has failed at the spot X. Then, according to Rules (1) and (2), the loop between the posts 3-1 and 3-2 turns into a terminal mode, as illustrated in FIG. 14(b). This case will be explained by replacing the post 3-2 by the relay designated post 3-1 and the post 3-3 by the relay designated post 3-2 in FIG. 10(f). For the purpose of changing the relay designated post 3-1 to a terminal mode, the relay 9 is brought into action, to close the contact 90, whereby the contact input goes to the mode change control circuit 42 of the relay designated post 3-1; a mode change report goes to the master station 2-I via the transmission control circuit 27A of the relay designated post 3-1 and thus, the master station confirms that the relay designated post 3-1 has turned to a terminal mode. Similarly, a mode change report on the transition of the relay designated post 3-2 to a terminal mode goes from the transmission control circuit 27B of the B-system via the mode change report/control circuit 42 of the B-system of the post 3-2 to the mode change report/memory circuit 41 of the terminal designated post 3-3 via the transmission control circuit 27A. The terminal designated post 3-3 which is in a terminal mode detects that the post 3-2 located between it and the master station on the left side has turned to a terminal mode. The mode control detect circuit 40 then on its own causes the relay drive circuit 43 to drop away, so as to thereby effect a transition to the relay mode, as illustrated in FIG. 14(c). Thus, the sound loops 3-2 and 3-3 which have been isolated from the master station 2-I come to be linked to the adjacent master station 2-II. Under this arrangement, the master stations 2-I, 2-II, 2-III share common information and since each master station is in possession of the transmitting code for each post belonging to a different master station, the master station 2-II can take the place of the master station 2-I to provide necessary information to the posts 3-2 and 3-3.

Upon recovery from channel fault, according to Rules (3)–(4), the X-section is filled with a carrier signal and a channel code begins to circulate to the loops on both sides of the X-section and in accordance with Rule (5), the relay designated posts located on both sides of the X-section turns to a relay mode, as illustrated in FIG. 14(d). Meanwhile, the relays 9 of the relay designated posts 3-1 and 3-2 goes become inactive, and the information goes to the mode change report/control circuit 42 of said posts via contact 90, and said circuit 42 transmits a relay mode change report signal via the code relay change circuits 61A and 61B to all the posts in Groups I and II. Thus, the mode change report/memory circuit 41 of the terminal designated post 3-3, existing in a relay mode, receives a relay mode change report from the A-system and the B-system. The mode control circuit 40 thereby knows that the master stations on both sides have taken part in the loop to which it belongs and the terminal designated post 3-3 is thus restored to the state of FIG. 14(a).

Next a case of the master station 2-II in group II having come down will be discussed referring to FIG. 10(f) and FIGS. 15(a) (b). With the master station 2-II down, the carrier signal from the master station 2-II is turned OFF. Thereupon, according to Rule (1), the relay designated posts 3-4 and 3-5 change to a terminal mode. In consequence, as indicated in FIG. 15(a), the loop for group II is split into three sub loops of the master station 2-II, the post 3-4 and post 3-5 and a terminal mode change report is submitted from the mode change report/control circuits 42 of the A-system of the post 3-4 and the B-system of the post 3-5, which have changed to a terminal mode.

The terminal designated post 3-3 existing in a terminal mode receives the mode change report at the mode change memory circuit 41 via the B-system, and the mode change control circuit 42 thereby knows that the posts located between it and the master station 2-II have changed to a terminal mode and thereby changes itself into a relay mode in accordance with Rule (10). Similarly, the terminal designated post 3-6 also changes itself and the post 3-6 to a relay mode, upon receiving a terminal mode transition report from the relay designated post 3-5. Thus, the isolated post 3-4 comes to merge in the loop of group I, while the isolated post 3-5 comes to merge in the loop of group III.

Upon recovery of the master station 2-II from the fault, according to Rule (4), a carrier signal begins to circulate to the fault section and, according to Rule (5), the posts 3-4 and 3-5 shift to a relay mode and, according to Rule (11), the terminal designated posts 3-3 and 3-6 which are in a relay mode, shift to a terminal mode.

Figure 16:
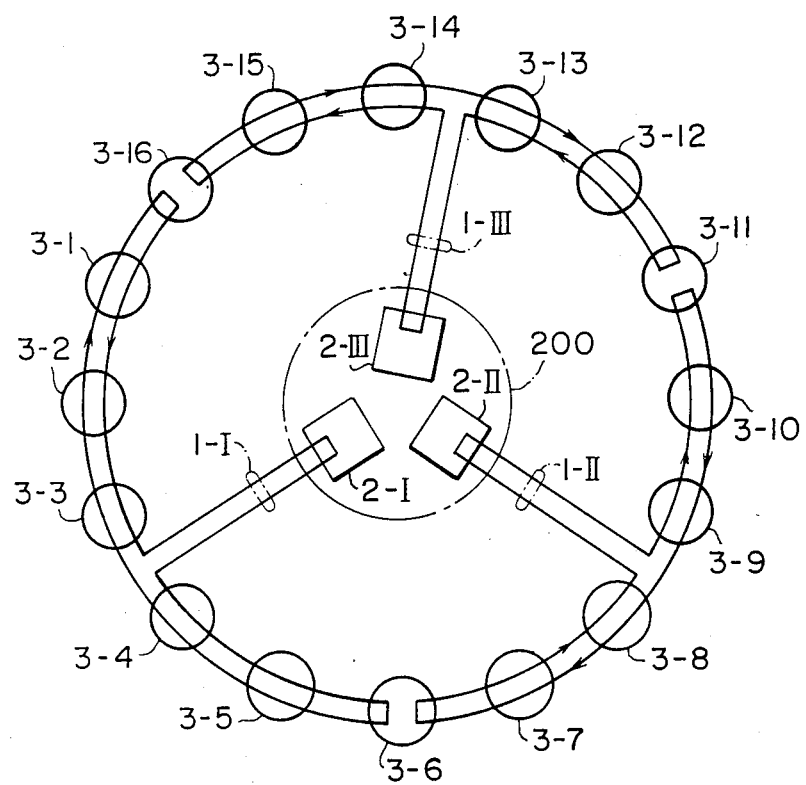
FIG. 16 is a circuit diagram illustrating still another embodiment of the present invention.

FIG. 16 illustrates still another embodiment of the present invention, in which the post 3 is located radially to the control station 200 and terminal designated posts 3-6, 3-11, 3-16 are installed on the group-to-group boundary. Posts 3-1 to 3-5, 3-7 to 3-10 and 3-12 to 3-15 are relay designated posts. In this embodiment too, a post isolated from the master station as a result of channel disorder can be merged in an adjacent group loop by making the terminal designated post bordering the loop of the isolated post shift to a relay mode and, in the same way as in the above-mentioned embodiment, the object of the present invention can be attained.

According to the present invention which proposes a scattered loop transmission system comprising only posts of identical function with no particular master post, when a channel failure or a fault accompanied with no drop in the carrier signal level happens, the fault section alone is separated with the part of the loop remaining sound. In other words, when there is any sound part in the separated section, the transmitting function in the sound part is retained. Upon restoration to normalcy, the loop can automatically return to a normal condition without any special operation. Therefore, unlike in the conventional system, the whole transmitting function does not cease in a separated loop and there is no need for the master post to issue a turnback cancel order when the channel is restored to normal condition and more importantly, a partial separation of the loop is possible even in the event of a loss or deterioration of the code relay function with no attendent drop in the the carrier signal level, which has been impossible in the conventional system.

In still another embodiment of the present invention in which a plurality of groups in which a master station and the scattered loop system according to the present invention are coupled in a group, the transmission between the control station and a post isolated from its master station or a post whose master station has come down is possible even when the post is isolated from its master station or even when a specific master station has come down and a direct information exchange with no intermediary of a master station is possible between posts in different groups. Thus, the technical benefits accruing from the present invention are remarkable.

What we claim is:

1. A loop type signal transmission channel control system comprising a plurality of information transmission posts which are linked up in a loop channel and arranged such that a channel idle code indicating a channel idle condition is normally circulated in the channel, each post regenerating and relaying said code; each post having a transmitting means arranged such that a post which must transmit information to other posts transmits such information to other posts after converting said channel idle code to a channel code indicating a channel busy condition under an assumption that a channel idle code was previously in circulation and, after said post has delivered said information, said post again delivers a channel idle code to the channel, whereby an assignment of the transmitting right is made between different posts; said system further comprising a means such that a post with the shortest detection time for the detection of an absence of a channel code in the loop initially delivers the channel idle code and delivers said channel idle code after an absence of a channel code wherein each post, which operates in either direction of one loop comprises: an A-system for operating in one loop direction and a B-system for operating in the other loop direction and a mode switch circuit for switching between a relay mode for coupling said post so as to relay a signal and a terminal mode for coupling said post so as to separate its A-system from its B-system for turning back a signal; each of said A and B systems comprising a circuit for detecting a channel carrier signal OFF and a circuit for generating a carrier ON-OFF signal and a circuit for detecting an approach and circulation of a channel code; wherein a post which has detected a channel carrier signal OFF switches itself into a terminal mode by its mode switch circuit and returns a carrier ON-OFF signal and a post which has detected the carrier ON-OFF signal switches itself into a terminal mode while continuing to output a second carrier ON-OFF signal, and wherein, when a channel carrier signal OFF occurs, a part of a loop including the source of the channel carrier signal OFF and a part of loop not including the source of the channel carrier signal OFF are distinguished and when a post in a terminal mode determines from its approach and circulation detect circuit that a channel code has circulated to both loops of the terminal post, then said post switches itself to a relay mode by its mode switch circuit and said two parts of the loop are merged again when the channel carrier signal OFF vanishes.

2. A loop type signal transmission channel control system as recited in claim 1, wherein each post includes a detection circuit for detecting a continuous absence of the channel code, and a circuit for outputting a split code so as to order a post to switch to a terminal mode and a circuit for detecting approach and circulation of the chanel code; and wherein a post which is in a relay mode has detected a continuous absence of a channel code, switches itself to a terminal mode by means of said mode switch circuit; and wherein a post which is in a terminal mode has detected a continuous absence of a channel code outputs a split code and a post which has received said split code relays said split code and at the same time switches itself to a terminal mode by means of said mode switch circuit; and wherein when a post in a terminal mode determines from its channel code approach and circulation detect circuit that a channel code is circulating to the loops on both sides of it, said post switches itself to a relay mode by its mode switch circuit, wherein the loops on both sides of it merge into a single loop; and wherein split elements of the loop in which the channel code is circulating are successively merged together and finally a part of loop including a fault and a part of loop not including the fault are distinguished and wherein upon recovery from the fault, a channel code circulates to the loop including the fault, and the parts of the loop are merged into a single loop.

3. A loop type signal transmission channel control system as recited in claim 1, wherein a master station is coupled to a loop channel constituting a group and wherein a plurality of such groups are provided; and wherein opposite ends of adjacent channels in such groups serve as a terminal designated post such that when a fault occurs in a channel of a specific group, posts on both sides of the loop including the fault change to a terminal mode and such that the terminal designated post, when it detects a sound loop isolated from its master station on one side loop of said terminal designated post, switches itself into a relay mode so as to cause said sound loop to merge in a channel of a different master station and upon recovery from the fault, said terminal designated post switches itself into a terminal mode so as to return the channel to its original condition.

* * * * *